United States Patent
Xin

(10) Patent No.: US 11,416,681 B2
(45) Date of Patent: Aug. 16, 2022

(54) METHOD AND APPARATUS FOR DETERMINING A REPLY STATEMENT TO A STATEMENT BASED ON A SUM OF A PROBABILITY OF THE REPLY STATEMENT BEING OUTPUT IN RESPONSE TO THE STATEMENT AND A SECOND PROBABILITY IN WHICH THE STATEMENT IS OUTPUT IN RESPONSE TO THE STATEMENT AND FURTHER BASED ON A TERMINATOR

(71) Applicant: TENCENT TECHNOLOGY (SHENZHEN) COMPANY LIMITED, Shenzhen (CN)

(72) Inventor: Yuan Xin, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 482 days.

(21) Appl. No.: 16/360,000

(22) Filed: Mar. 20, 2019

(65) Prior Publication Data

US 2019/0220513 A1 Jul. 18, 2019

Related U.S. Application Data

(63) Continuation of application No. PCT/CN2017/109769, filed on Nov. 7, 2017.

(30) Foreign Application Priority Data

Dec. 15, 2016 (CN) .......................... 201611161666.0

(51) Int. Cl.
*G06F 40/284* (2020.01)
*G06F 40/30* (2020.01)
(Continued)

(52) U.S. Cl.
CPC .......... *G06F 40/284* (2020.01); *G06F 40/216* (2020.01); *G06F 40/274* (2020.01);
(Continued)

(58) Field of Classification Search
CPC ................................. G06F 40/30; G10L 15/20
See application file for complete search history.

(56) References Cited

U.S. PATENT DOCUMENTS 10,013,981 B2 * 7/2018 Ramprashad ........... G10L 15/20
2006/0235689 A1 10/2006 Sugihara et al.
(Continued)

FOREIGN PATENT DOCUMENTS

CN 106710596 A 5/2017

OTHER PUBLICATIONS

"A Diversity-Promoting Objective Function for Neural Conversation Models" (Li et al.,) (arXiv) (Jun. 10, 2016).*
(Continued)

*Primary Examiner* — Farzad Kazeminezhad
(74) *Attorney, Agent, or Firm* — ArentFox Schiff LLP

(57) ABSTRACT

Aspects of the present disclosure provide a method and an apparatus for determining a reply to a statement. The apparatus includes processing circuitry determining, based on a preset lexicon, potential reply statements in response to a statement, and first matching probabilities respectively corresponding to the potential reply statements. A first matching probability indicates a probability of the corresponding potential reply statement being output in response to the statement according to the preset lexicon. The processing circuitry also obtains second matching probabilities respectively corresponding to the potential reply statements. A second matching probability indicates a probability of words in the statement being output in response to the corresponding potential reply statement according to the preset lexicon.

(Continued)

According to a combination of the first matching probabilities and the second matching probabilities, the processing circuitry selects one of the potential reply statements as a target reply statement.

20 Claims, 5 Drawing Sheets

(51) Int. Cl.
     *H04L 51/02*      (2022.01)
     *G10L 15/22*      (2006.01)
     *G10L 15/197*      (2013.01)
     *G06F 40/40*      (2020.01)
     *G06F 40/44*      (2020.01)
     *G06F 40/56*      (2020.01)
     *G06F 40/216*      (2020.01)
     *G06F 40/274*      (2020.01)

(52) U.S. Cl.
     CPC .............. *G06F 40/40* (2020.01); *G06F 40/44* (2020.01); *G06F 40/56* (2020.01); *G10L 15/197* (2013.01); *G10L 15/22* (2013.01); *H04L 51/02* (2013.01)

(56) References Cited

U.S. PATENT DOCUMENTS

| 2007/0022099 A1 | 1/2007 | Yoshimura et al. |
| 2015/0370787 A1 | 12/2015 | Akbacak et al. |
| 2018/0131645 A1* | 5/2018 | Magliozzi ............... G06F 40/30 |

OTHER PUBLICATIONS

"GPU Asyncronous Stochastic Gradient Descent to Speed Up Neural Network Training" "Paine et al." "arXiv" "Dec. 21, 2013".*

Chinese Search Report dated Feb. 7, 2018 in International Application No. PCT/CN2017/109769, (12 pages).

Sutskever et al., "Sequence to Sequence Learning with Neural Networks," Sep. 30, 2014 (9 pages).

Li et al., "Deep Reinforcement Learning for Dialogue Generation," Proceedings of the 2016 Conference on Empirical Methods in Natural Language Processing, Austin, TX, Nov. 1-5, 2016 (11 pages).

Wen et al., "Semantically Conditioned LSTM-based Natural Language Generation for Spoken Dialogue Systems," Proceedings of the 2015 Conference on Empirical Methods in Natural Language Processing, Lisbon, Portugal, Sep. 17-21, 2015 (11 pages).

* cited by examiner

METHOD AND APPARATUS FOR DETERMINING A REPLY STATEMENT TO A STATEMENT BASED ON A SUM OF A PROBABILITY OF THE REPLY STATEMENT BEING OUTPUT IN RESPONSE TO THE STATEMENT AND A SECOND PROBABILITY IN WHICH THE STATEMENT IS OUTPUT IN RESPONSE TO THE STATEMENT AND FURTHER BASED ON A TERMINATOR

RELATED APPLICATION

This application is a continuation of International Application No. PCT/CN2017/109769, filed on Nov. 7, 2017, which claims priority to Chinese Patent Application No. 201611161666.0, filed with the Chinese Patent Office on Dec. 15, 2016, and entitled "Answer Statement Determining Method and Apparatus". The entire disclosures of the prior applications are hereby incorporated by reference in their entirety.

FIELD OF THE TECHNOLOGY

The present disclosure relates to the field of natural language processing, and in particular, to a reply statement determining method, and a server.

BACKGROUND OF THE DISCLOSURE

A chatterbot is an important application in the field of natural language processing. A chatterbot may return a corresponding reply statement according to a statement entered by a user, to implement human computer interaction. The user may enter any statement, for example, the user may enter "It is so hot lately", and the chatterbot may return "True indeed" as a reply statement.

For example, currently, a sequence to sequence (sequence2sequence) model may be used to implement a function of a chatterbot, to determine a reply statement. The sequence2sequence model includes a coder and a decoder. The coder and the decoder can both be obtained by training a recurrent neural network by using a large quantity of sample statements of natural languages. During human computer interaction, the coder may encode a statement entered by a user, into a statement vector, and then input the statement vector into the decoder; and the decoder performs matching between the statement vector and each word in a lexicon, and in a first matching process, calculates a matching probability between each word in the lexicon and the statement vector, to obtain a prediction word having a highest matching probability in prediction words. In each of subsequent matching processes, all obtained prediction words having highest matching probabilities and the statement vector are used as an input during current matching, and a matching probability between each word in the lexicon and the statement vector is calculated. Next, a prediction word having a highest matching probability in current prediction words is obtained, and the process does not end until an obtained prediction word having a highest matching probability is a statement terminator. A statement is made up of each prediction word having a highest matching probability, and used as a to-be-returned reply statement.

During an actual conversation between people, when giving a reply, a respondent needs to consider content said by a questioner; and when the questioner speaks, the questioner needs to consider an identity of the respondent and content that the respondent may reply. That is, one pair of a question A and a reply statement B corresponds to one linguistic context. For the question A, the reply statement B is a reply that best meets the linguistic context, and for the reply statement B, the question A is a question that best meets the linguistic context. However, during current human computer interaction, the foregoing dialog effect cannot be achieved. Consequently, intelligence of human computer interaction is relatively poor.

SUMMARY

Aspects of the present disclosure provide a method and an apparatus for determining a reply to a statement.

In some examples, the apparatus includes memory circuitry and processing circuitry. The memory circuitry stores a preset lexicon. The processing circuitry determines, based on the preset lexicon in the memory circuitry, a plurality of potential reply statements in response to a statement, and a plurality of first matching probabilities respectively corresponding to the plurality of potential reply statements. A first matching probability in the plurality of first matching probabilities indicates a probability of the corresponding potential reply statement being output in response to the statement according to the preset lexicon. The processing circuitry also obtains a plurality of second matching probabilities respectively corresponding to the plurality of potential reply statements. A second matching probability in the second matching probabilities indicates a probability of words in the statement being output in response to the corresponding potential reply statement according to the preset lexicon. According to a combination of the first matching probabilities and the second matching probabilities, the processing circuitry thus selects one of the potential reply statements as a target reply statement.

According to an aspect of the disclosure, the processing circuitry matches the statement to words in the preset lexicon to determine a plurality of matching words with the first matching probabilities. Based on the plurality of matching words, the processing circuitry initializes intermediate statements. Then the processing circuitry repetitively matches an intermediate statement to the words in the preset lexicon to determine additional intermediate words for continuously adding into the intermediate statement to grow the intermediate statement until a statement terminator is added. When the statement terminator is added into the intermediate statement, the intermediate statement is finalized by the processing circuitry to a potential reply statement.

According to an aspect of the disclosure, the processing circuit matches the intermediate statement to the words in the preset lexicon to determine matching words with first intermediate matching probabilities. Then the processing circuitry selects a subset of the matching words to add into the intermediate statement to respectively form potential intermediate statements for a next matching, according to a sorted sequence of the first intermediate matching probabilities.

In some embodiments, the processing circuitry further matches the potential intermediate statements having respective first intermediate matching probabilities to the words in the preset lexicon to determine respective second intermediate matching probabilities for matching existing words in the intermediate statement. Then the processing circuitry associates respective sums of the first intermediate matching probabilities and the second intermediate matching probabilities to the potential intermediate statements, and selects a subset of the potential intermediate statements for the next matching, according to a sorted sequence of the sums.

According to an aspect of the disclosure, the processing circuitry matches the statement to the words in the preset lexicon to determine potential matching words with first intermediate matching probabilities, and sorts the first intermediate matching probabilities in a sequence from high to low. Then the processing circuitry selects the plurality of matching words from the potential matching works according to the sorted sequence.

In some embodiments, the processing circuitry further matches the potential matching words to the words in the preset lexicon to determine second intermediate matching probabilities for matching existing words in the statement. Then the processing circuitry associates respective sums of first intermediate matching probabilities and second intermediate matching probabilities to the potential matching words, and selects a subset of the potential matching words as the plurality of matching words according to the sorted sequence.

According to an aspect of the disclosure, the processing circuitry performs matching operations using a preset neural network to determine the first matching probabilities and the second matching probabilities.

In some embodiments, the apparatus further includes multiple graphics processing units (GPUs). The multiple GPUs calculate gradients based on sample inputs to a neural network model and outputs of the neural network model in response to the sample inputs. The processing circuitry determines an average of the gradients calculated by the GPUs and adjusts parameters of nodes in the neural network model according to the average of the gradients.

Aspects of the disclosure also provide a non-transitory computer-readable storage medium storing instructions which when executed by a computer cause the computer to perform the method for determining a reply statement.

BRIEF DESCRIPTION OF THE DRAWINGS

To describe the technical solutions of the embodiments of the present disclosure more clearly, the following briefly introduces the accompanying drawings for describing the embodiments. The accompanying drawings in the following description show merely some embodiments of the present disclosure, and a person of ordinary skill in the art may still derive other drawings from these accompanying drawings.

DESCRIPTION OF EMBODIMENTS

To make the objectives, technical solutions, and advantages of the present disclosure clearer, the following further describes implementations of the present disclosure in detail with reference to the accompanying drawings.

An application scenario of a reply statement determining method provided in an embodiment may be a human computer interaction scenario, for example, a chat between a human and a computer, or may be an intelligent question-replying system, for example, an intelligent customer service system in the verticality field. This is not limited in this embodiment. When the application scenario is an intelligent question-replying system, for a question asked by a user, multiple target reply statements may be determined. In this case, one target reply statement may represent one reply.

Figure 1:
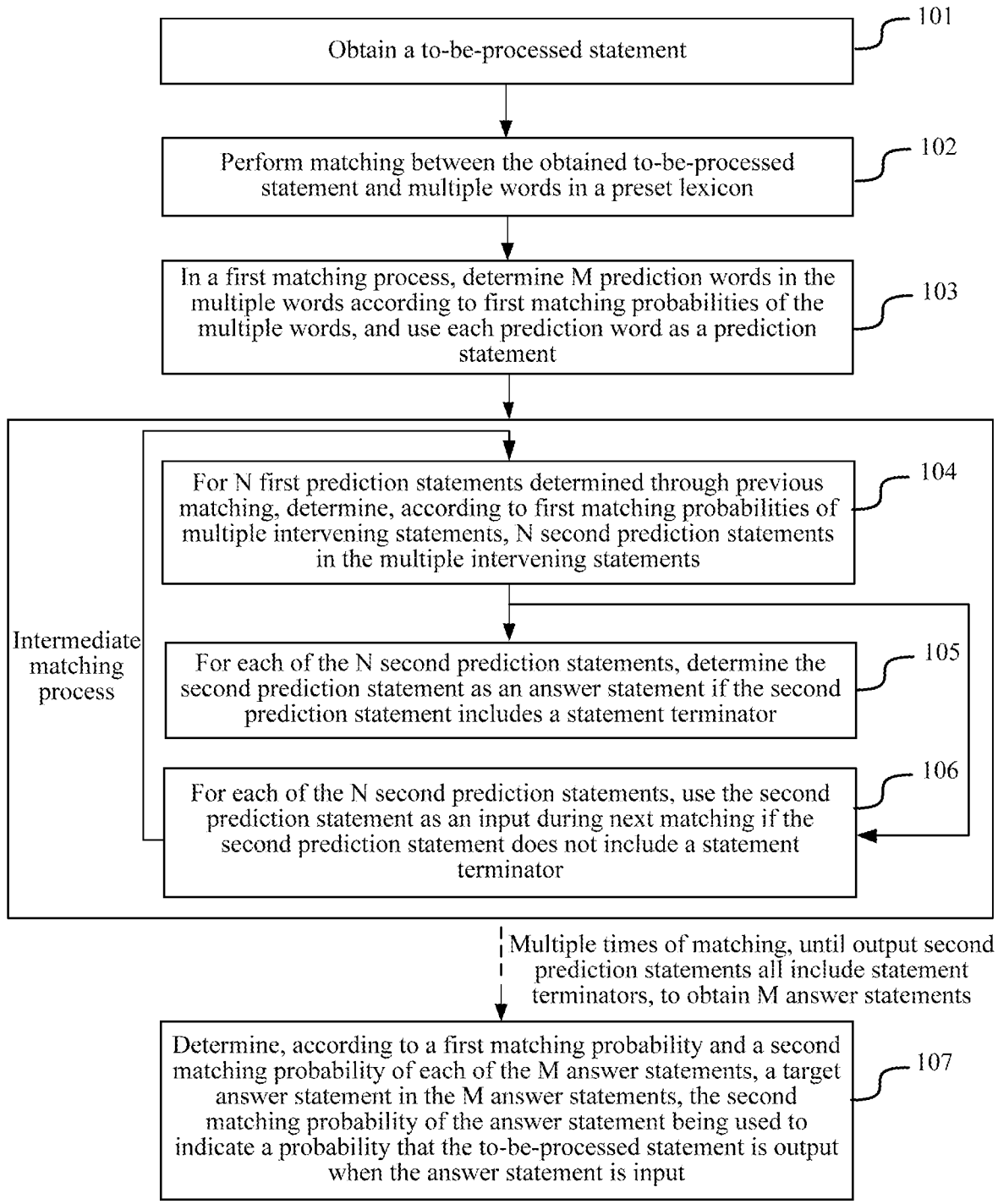
FIG. 1 is a flowchart of a reply statement determining method according to an embodiment of the present disclosure.

FIG. 1 is a flowchart of a reply statement determining method according to an embodiment of the present disclosure. Referring to FIG. 1, a procedure of the method provided in this embodiment of the present disclosure includes the following steps.

101: A server obtains a to-be-processed statement.

The to-be-processed statement may be a sentence, or may be a word or a term, or the like. A language corresponding to the to-be-processed statement may be any one of Chinese, English, French, and the like. Content of the to-be-processed statement and a language to which the to-be-processed statement belongs are not limited in this embodiment.

In this embodiment, a terminal may provide a human computer interaction interface. In the human computer interaction interface, a user may enter any content, for example, any word or statement, in an input box and the content may be in a form of a text, an image, a voice, or the like. This is not limited in this embodiment. After detecting an input confirmation operation, the terminal obtains the content entered by the user in the input box, as a to-be-processed statement. Subsequently, the terminal may send the to-be-processed statement to a server by using a network, so that the server can obtain the to-be-processed statement, and perform the following step 102 to step 107, to determine a target reply statement of the to-be-processed statement.

When the entered content is an image, text content in the image may be obtained through image recognition, as a to-be-processed statement. For example, the text content may be text information displayed in the image, or may be text information corresponding to a scene described by the image. When the entered content is a voice, text information of the voice may be obtained through speech recognition, as a to-be-processed statement.

It is noted that, when the terminal can independently perform human computer interaction, step 101 may be replaced with that a terminal obtains a to-be-processed statement, and after obtaining the to-be-processed statement, the terminal may locally perform the following step 102 to step 107, to determine a target reply statement of the to-be-processed statement, and output the target reply statement in the human computer interaction interface, to complete a human computer interaction process. In this embodiment, an example in which the server is an executing body is used for description, but the executing body is not limited.

Further, the target reply statement may be output in different manners, that is, regardless of a content form of the to-be-processed statement, the target reply statement is output in a form of a text, or corresponding target reply statements may be output according to different content forms of the to-be-processed statement. For example, when the content of the to-be-processed statement is in a form of a text, the output target reply statement is also in a form of a text; or when the content of the to-be-processed statement is in a form of an image, the output target reply statement is in a form of an image; or when the content of the to-be-processed statement is in a form of a voice, the output target reply statement is in a form of a voice. Certainly, if in an actual statement processing process, text based processing is performed, after the target reply statement in a form of a text is obtained, the target reply statement in a form of a text may be converted into an actually required form according to an actual requirement.

102: The server performs matching between the obtained to-be-processed statement and multiple words in a preset lexicon, where the matching process includes the following step 103 to step 107.

The preset lexicon is used to store multiple words involved in a natural language. A quantity of the multiple words may be a hundred thousand or even a million, or the like. A word in the preset lexicon may be a single word or a phrase, which is collectively referred to as a word in this embodiment. For example, a word may be "eat", or "something". In addition, the preset lexicon may further include symbols, for example, various punctuation marks, emoticons, or statement terminators.

In this embodiment, the server performs, by using a preset neural network, the process of performing matching between the obtained to-be-processed statement and the multiple words in the preset lexicon. In the matching process, the server first converts the to-be-processed statement into a corresponding statement vector. The conversion process may be: performing word segmentation processing on the to-be-processed statement, to obtain multiple segmented words; encoding each segmented word into a word vector according to a preset coding scheme, to obtain multiple word vectors; and then, converting the multiple word vectors into the statement vector according to a preset conversion function. Subsequently, matching is performed according to the statement vector. It is noted that, statement and word processing processes involved in this embodiment are all processes of processing statement vectors corresponding to statements or word vectors corresponding to words. The preset coding scheme and the preset conversion function may be preset or modified. This is not limited in this embodiment.

There is a one-to-one mapping relationship between nodes in the preset neural network and the words stored in the preset lexicon. For example, when the preset lexicon includes 200,000 words, an intermediate matching output layer of the preset neural network may include 200,000 nodes.

The preset neural network may be a time recursive neural network (Long Short-Term Memory, LSTM). More layers of the neural network indicate a more accurate output result, but a computing speed is lowered. Therefore, to improve the computing speed while satisfying output accuracy, in this embodiment, a four-layer LSTM is used. Certainly, as processing performance of a device is improved, an LSTM having more than four layers may be used.

In this embodiment, before the to-be-processed statement entered by the user is replied by using the preset neural network, the preset neural network needs to be trained by using a large quantity of sample data, to optimize a parameter of each node in the preset neural network. Specifically, multiple graphics processing units (GPU) may be deployed on the server, and the preset neural network is deployed on each GPU. The server may divide a large quantity of sample data into multiple corresponding sample data sets, and allocate the multiple sample data sets respectively to the multiple GPUs for processing, to implement parallel processing on the sample data, thereby greatly improving efficiency of training the preset neural network, that is, improving efficiency of optimizing the parameter corresponding to each node in the preset neural network. It is noted that, one piece of sample data involved in this embodiment is a pair of natural language dialogs.

Figure 2A:
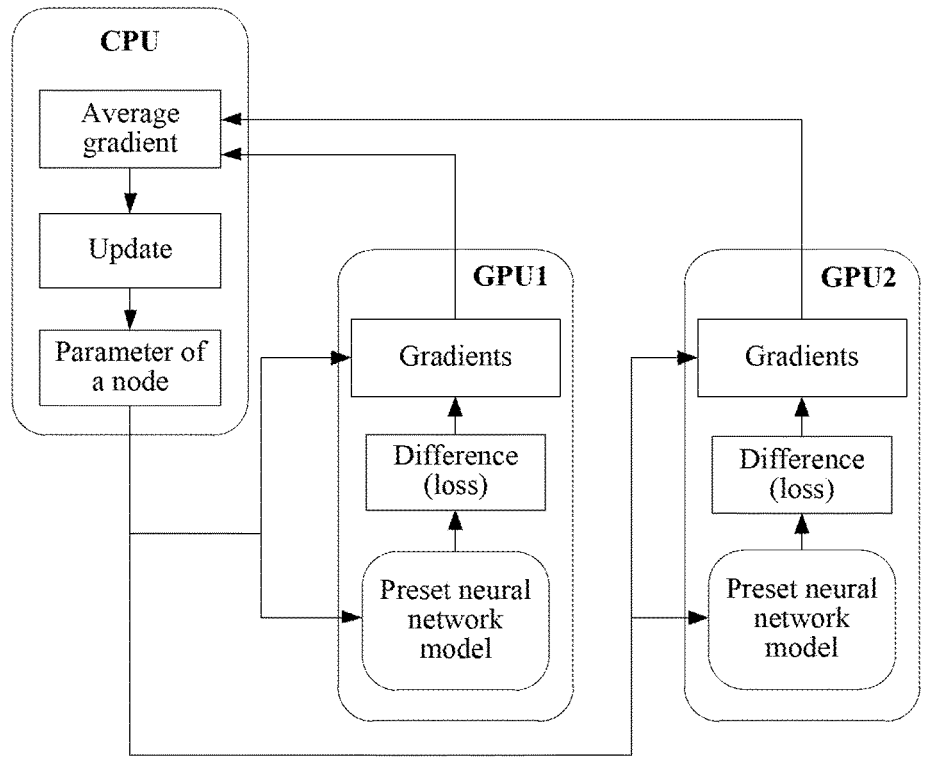
FIG. 2A is a principle diagram of training a neural network according to an embodiment of the present disclosure.

FIG. 2A is a principle diagram of training the preset neural network. As shown in FIG. 2A, a CPU and multiple GPUs are included. The CPU stores the parameter corresponding to each node in the preset neural network, and the preset neural network (model) is deployed on each GPU. Specifically, a parameter optimization process may be as follows: Each GPU processes input sample data by using the preset neural network, determines a difference (loss) between an output and an input according to a preset target function, and calculates a gradient of the difference according to a preset gradient function; and each GPU sends the calculated gradient to the CPU, and the CPU calculates an average gradient of multiple received gradients. Next, the server adjusts, according to the average gradient, the parameter of the node in the preset neural network configured for the multiple GPUs. The adjustment process may be as follows: The CPU updates the stored parameter of the node in the preset neural network according to the average gradient, and then sends the updated parameter of the node in the preset neural network to each GPU, so that the GPU adjusts a parameter of the configured preset neural network. For any node, a parameter of the node includes a location of the node in the preset neural network and a parameter value. For any node, an updated parameter value of the node is equal to a difference between a parameter value of the node before the update and the average gradient. The preset target function and the preset gradient function may be set or modified according to an actual requirement. This is not limited in this embodiment.

It is noted that, in this embodiment, each GPU may process one sample data set all at once. For example, the sample data set may include 60 pairs of natural language dialogs, and each GPU may use the 60 pairs of natural language dialogs as an input of the preset neural network; and correspondingly, a calculated gradient is an overall gradient of the sample data set, thereby improving a speed of processing sample data.

It is noted that, in FIG. 2A, two GPUs are used as an example for description; certainly, a quantity of GPUs may be 3, 4, or the like. This is not limited in this embodiment. FIG. 2A shows a manner of training the preset neural network through data parallelization. In another embodiment, the preset neural network may be trained through model parallelization. An example in which the preset neural network is a four-layer LSTM is used. The layers of the preset neural network may be sequentially configured on each of four different GPUs according to a sequence of an input layer to an output layer, and the four GPUs are used to optimize a parameter of a node on each layer. A preset buffer may be set in each GPU, and the preset buffer is used to store data that needs to be exchanged with another GPU, thereby improving a speed of exchange between the layers of the preset neural network. The data that is exchanged with another GPU may be an output result of a corresponding layer of a current GPU.

103: In a first matching process, the server determines M prediction words in the multiple words according to first matching probabilities of the multiple words, and uses each prediction word as a prediction statement.

The first matching probability of each of the multiple words is used to indicate a probability that the word is output when the to-be-processed statement is input. M is an integer greater than 1, and M may be preset or changed as required, for example, M may be 3, 4, or 5. This is not limited in this embodiment. Multiple prediction words may be determined in one matching process, so that more potential reply statements may be made up, thereby expanding a matching range of the reply statement, and improving diversity of an output result.

In this embodiment, the M prediction words may be determined in the following two manners:

A first manner: The M prediction words are determined in the multiple words based on a descending order of the first matching probabilities of the words.

In this manner, for each of the multiple words, the to-be-processed statement is used as an input, and the probability that the word is output is obtained; and the probability that the word is output is used as the first matching probability of the word. The M prediction words are obtained from the multiple words based on a descending order of the first matching probabilities of the words. The M prediction words are prediction words that are in the multiple words and whose matching probabilities are ranked top M.

It is noted that, one preset function corresponds to a node corresponding to each word in the preset neural network, and the preset function is used to calculate, according to an input, a probability that the word corresponding to the node is output. The preset function may be preset or modified as required. This is not limited in this embodiment.

A second manner: The M prediction words are determined in the multiple words based on a descending order of sums of the first matching probabilities and second matching probabilities of the words.

In this manner, for each of the multiple words, the to-be-processed statement is used as an input, and the probability that the word is output is determined as the first matching probability of the word. Subsequently, the word is used as an input, and a probability that the to-be-processed statement is output is determined as a second matching probability of the word. The sum of the first matching probability and the second matching probability of each word is obtained; and the M prediction words are determined in the multiple words based on a descending order of the sums. The M prediction words are prediction words that are in the multiple words and that have sums ranked top M.

The process of obtaining the sum of the first matching probability and the second matching probability of each word may be considered as a process of scoring each word, and a score is the sum of the first matching probability and the second matching probability. A higher score of a word indicates a higher probability that the word is output, so that the M prediction words having highest output probabilities may be determined according to scores.

One of the multiple words is used as an input, and the probability that the to-be-processed statement is output is a sum of probabilities of multiple segmented words making up the to-be-processed statement. For example, assuming that the to-be-processed statement is "Good day", and segmented words making up the to-be-processed statement is "Good" and "day", the probability that the to-be-processed statement is output is a sum of a probability that "Good" is output and a probability that "day" is output.

It is noted that, in the second manner, when the M prediction words are determined, the probability that each word is output when the to-be-processed statement is input needs to be considered, and the probability that the to-be-processed statement is output when each word is input further needs to be considered, so that the determined M prediction words and the to-be-processed statement better meet a linguistic context, thereby improving intelligence of human computer interaction. In this embodiment, each determined prediction word is used as a prediction statement, to facilitate description of a subsequent matching process.

For each matching process after the first matching, the following step 104 to step 106 are performed.

104: For N first prediction statements determined through previous matching, the server determines, according to first intermediate matching probabilities of multiple intermediate statements, N second prediction statements in the multiple intermediate statements.

Each intermediate statement is made up of any first prediction statement and any one of the multiple words. For example, if a quantity of first prediction statements is 3, and a quantity of the multiple words is 10, one first prediction statement and the 10 words can make up 10 intermediate statements, and the three first prediction statements and the 10 words may make up 30 intermediate statements.

A first prediction statement is a prediction statement not including a statement terminator. When a prediction statement includes a statement terminator, it indicates that the prediction statement is a potential reply statement, and a matching process for the prediction statement ends.

N is an integer less than or equal to M. Specifically, N is a difference between M and a quantity of potential reply statements determined in a previous matching process. To ensure that a result can be output, a prediction word determined through first matching should not be a statement terminator. Therefore, for second matching, a quantity of potential reply statements is 0, and N is equal to M. In this way, the N first prediction statements are prediction statements corresponding to the M prediction words. For example, if three prediction words are determined in the first matching process, each prediction word is used as a prediction statement, and there are three prediction statements in total, the three prediction statements are three first prediction statements in the second matching process. Assuming that one potential reply statement is determined in the second matching process, in a third matching process, a quantity of potential reply statements is 1, and correspondingly, a quantity of first prediction statements is 2.

In this embodiment, the process of determining the N second prediction statements in the multiple intermediate statements may include the following two manners:

A first manner: The N second prediction statements are determined in the multiple intermediate statements based on a descending order of the first intermediate matching probabilities of the intermediate statements. The N second prediction statements are intermediate statements that are in the multiple intermediate statements and whose intermediate matching probabilities are ranked top N.

In this manner, for each intermediate statement, a first prediction statement corresponding to the intermediate statement, and the to-be-processed statement are used as an input, and a probability that the intermediate statement is output is determined as the first intermediate matching probability of the intermediate statement. Subsequently, the N second prediction statements are determined in the multiple intermediate statements based on a descending order of the first intermediate matching probabilities.

A probability that an intermediate statement is output is a probability that the last in words that make up the intermediate statement is output when the first prediction statement and the to-be-processed statement are input. For example, assuming that the first prediction statement is a1, and the preset lexicon includes 10 words that are respectively w1 to w10, an intermediate statement made up of a1 and w1 is a1w1, and a probability that a1w1 is output is a probability that w1 is output when the to-be-processed statement and a1 are input.

During specific implementation, the process of determining the N second prediction statements may be as follows: For each first prediction statement, N intermediate statements are determined, based on a descending order of the first intermediate matching probabilities, in intermediate statements corresponding to the first prediction statement, where corresponding to each first prediction statement, N intermediate statements are obtained, and a total of N*N intermediate statements are obtained; then, the N second prediction statements are determined in the N*N intermediate statements based on a descending order of the first intermediate matching probabilities. "*" indicates a multiplication operation.

A second manner: The N second prediction statements are determined in the multiple intermediate statements based on a descending order of sums of the first intermediate matching probabilities and second intermediate matching probabilities of the intermediate statements.

In this manner, for each intermediate statement, a first prediction statement corresponding to the intermediate statement, and the to-be-processed statement are used as an input, and a probability that the intermediate statement is output is determined as the first intermediate matching probability of the intermediate statement; the intermediate statement is used as an input, and a probability that the to-be-processed statement is output is determined as the second intermediate matching probability of the intermediate statement; the sum of the first intermediate matching probability and the second intermediate matching probability of each intermediate statement is obtained; and the N second prediction statements are determined in the multiple intermediate statements based on a descending order of the sums. The N second prediction statements are intermediate statements that are in the multiple intermediate statements and that have sums ranked top N.

The process of obtaining the sum of the first intermediate matching probability and the second intermediate matching probability of each intermediate statement may be considered as a process of scoring each intermediate statement, and a score is the sum of the first intermediate matching probability and the second intermediate matching probability. A higher score of an intermediate statement indicates a higher probability that the intermediate statement is output, so that the M prediction statements having highest output probabilities may be determined according to scores.

An intermediate statement is used as an input, and the probability that the to-be-processed statement is output is a sum of probabilities that multiple segmented words making up the to-be-processed statement are output, and the sum of the probabilities of the multiple segmented words is used as a second intermediate matching probability of the intermediate statement. The process is similar to the process of determining the second matching probability of each word in step 103, and details are not described herein again.

Assuming that the to-be-processed statement is X, an intermediate statement is Y, a first intermediate matching probability of Y may be indicated as P(Y|X), and a second intermediate matching probability of Y may be indicated as P(X|Y), a score of Y may be indicated, according to a sum, as: SCORE=P(Y|X)+P(X|Y). P( ) indicates a probability, and does not indicate an specific probability calculation manner.

During specific implementation, the process of determining the N second prediction statements may be as follows: For each first prediction statement, N intermediate statements are determined, based on a descending order of the sums, in intermediate statements corresponding to the first prediction statement, where corresponding to each first prediction statement, N intermediate statements are obtained, and a total of N*N intermediate statements are obtained; and then, the N second prediction statements are determined in the N*N intermediate statements based on a descending order of the sums. "*" indicates a multiplication operation.

It is noted that, in the second manner, when the N prediction statements are determined, the probability that each prediction statement is output when the to-be-processed statement is input needs to be considered, and the probability that the to-be-processed statement is output when each prediction statement is input further needs to be considered, so that the determined N prediction statements and the to-be-processed statement better meet a linguistic context, thereby improving intelligence of human computer interaction.

It is noted that, in this embodiment, each matching process is a process of obtaining a next prediction word through subsequent matching based on a prediction statement obtained through previous matching. In the process of obtaining a next prediction word through matching, the foregoing two manners may be used. A prediction word obtained through current matching and the prediction statement obtained through the previous matching make up a current prediction statement. For example, assuming that the to-be-processed statement is "Lately it's so hot that I will faint", and a first prediction statement is "Take care of yourself", in the current matching process, based on the to-be-processed statement and the first prediction statement, and based on the first prediction statement, a next prediction word is obtained through subsequent matching. Assuming that the prediction word obtained through current matching is "dear", a prediction statement obtained through current matching is "Take care of yourself, dear".

In this embodiment, after the N second prediction statements are determined, whether a matching process for the second prediction statement ends may be determined according to whether the second prediction statement includes a statement terminator. For each of the N second prediction statements, when the second prediction statement includes a statement terminator, step 105 is performed; otherwise, step 106 is performed.

105: For each of the N second prediction statements, the server determines the second prediction statement as a potential reply statement if the second prediction statement includes a statement terminator.

For example, the first prediction statement is "Take care of yourself". Assuming that a prediction word obtained through subsequent matching based on the first prediction statement is a statement terminator, a second prediction statement made up of the first prediction statement and the statement terminator is a potential reply statement, that is, for the second prediction statement, subsequent matching does not need to be performed.

106: For each of the N second prediction statements, the server uses the second prediction statement as an input during next matching if the second prediction statement does not include a statement terminator, and continues to perform step 104, until second prediction statements output in matching processes all include statement terminators, to obtain M potential reply statements.

For example, the first prediction statement is "Take care of yourself". Assuming that a prediction word obtained through subsequent matching based on the first prediction statement is "dear", a second prediction statement made up of the first prediction statement and the prediction word is "Take care of yourself, dear". Because the second prediction statement does not include a statement terminator, step 104 continues to be performed based on the second prediction statement, and based on the second prediction statement, subsequent matching is performed. If a prediction word obtained through next matching is a statement terminator, the prediction statement "Take care of yourself, dear" and the statement terminator make up a potential reply statement "Take care of yourself, dear".

Figure 2B:
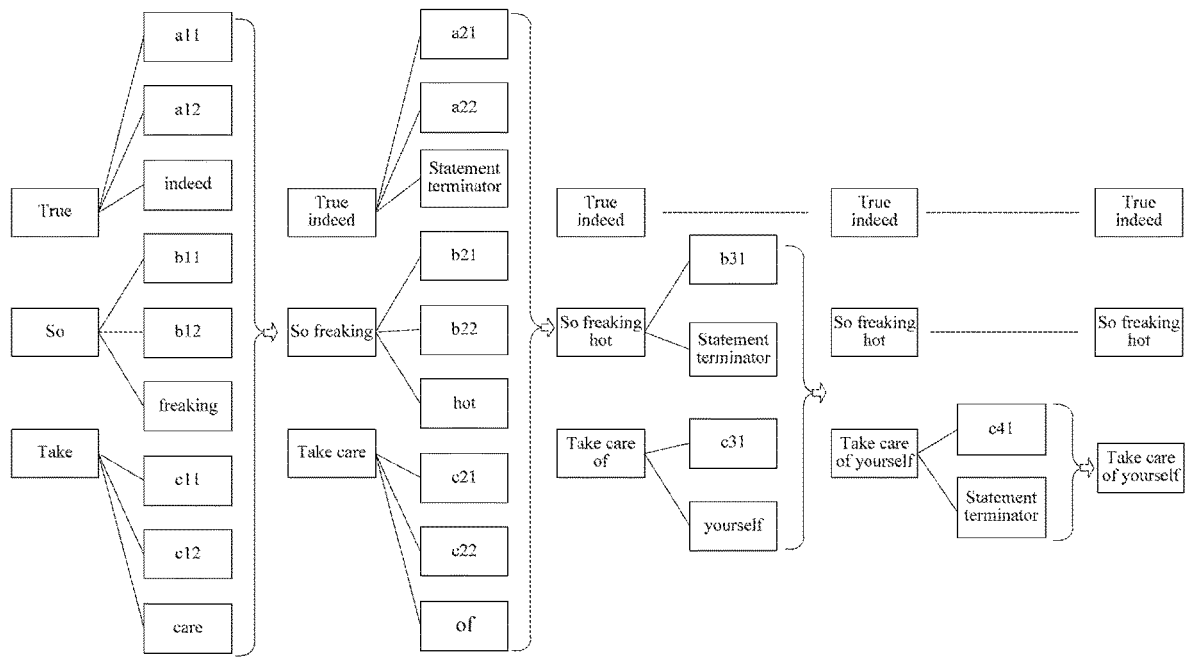
FIG. 2B is an example diagram of a reply statement determining process according to an embodiment of the present disclosure.

It is noted that, after determining the M prediction words in the first matching process, the server performs a subsequent matching process based on the M prediction words, to obtain the M potential reply statements. The process of determining the M potential reply statements through matching is better described by using an example with reference to FIG. 2B. In this process, when the prediction statement is determined, the second manner in step 104 is used. The to-be-processed statement is "Lately it's so hot that I will faint", M is 3, and three prediction statements that are respectively "True", "So", and "Take" are determined in the first matching process. The three prediction statements are three optimal results in the current matching process. In the second matching process, for each prediction statement, three prediction words are obtained through subsequent matching. For example, three prediction words that match "True" are respectively "a11", "a12", and "indeed", three prediction words that match "So" are respectively "b11", "b12", and "freaking", and three prediction words that match "Take" are respectively "c11", "c12", and "care". The prediction statements and the prediction words are separately combined to obtain nine filtered intermediate statements. Subsequently, the nine intermediate statements are sorted. Based on a descending order of sums of probabilities, multiple optimal results are determined in the nine intermediate statement, for example, prediction statements corresponding to the three determined optimal results are respectively "True indeed", "Freaking hot", and "Take care", and the three prediction statements are three optimal results output in the current matching process. Similarly, in the third matching process, three determined prediction statements are respectively "True indeed" (including a statement terminator), "So freaking hot", and "Take care of", to determine that "True indeed" is a potential reply statement. In a fourth matching process, for each of the two prediction statements "So freaking hot" and "Take care of", two prediction words are obtained through subsequent matching, and finally, in the current matching process, two prediction statements are determined. Assuming that the two prediction statements are "So freaking hot" (including a statement terminator) and "Take care of yourself", to determine that "So freaking hot" is a potential reply statement. In a fifth matching process, for the prediction statement "Take care of yourself", one prediction word is obtained through subsequent matching, and assuming that the prediction word obtained through matching is a terminator, it may be determined that "Take care of yourself" is an potential reply statement, to obtain three potential reply statements that are respectively "True indeed", "So freaking hot", and "Take care of yourself".

107: The server determines, according to a first matching probability and a second matching probability of each of M potential reply statements, a target reply statement in the M potential reply statements, the second matching probability of the potential reply statement being used to indicate a probability that the to-be-processed statement is output when the potential reply statement is input.

The process of determining the target reply statement may be: obtaining a sum of the first matching probability and the second matching probability of each of the M potential reply statements; and determining a potential reply statement having a highest sum as the target reply statement.

In this embodiment, multiple potential reply statements may be sorted according to sums of first matching probabilities and second probabilities of the multiple potential reply statements, and then a target reply statement having a highest sum may be determined in the multiple potential reply statements according to rankings of the multiple potential reply statements. Referring to the FIG. 2B example, assuming that three potential reply statements and corresponding sums that are output are respectively: "True indeed" and 0.5, "So freaking hot" and 0.8, and "Take care of yourself" and 0.9, rankings of the three potential reply statements may be shown in Table 1. It may be learned from Table 1 that, the potential reply statements are sorted according to sums for the potential reply statements, and a potential reply statement that meets a linguistic context with the to-be-processed statement is ranked before a potential reply statement that does not meet the linguistic context, thereby improving intelligence of determining a target statement.

TABLE 1

| Rankings | Potential reply statement |
| --- | --- |
| 1 | Take care of yourself |
| 2 | Freaking hot |
| 3 | True indeed |

In addition, when an application scenario is an intelligent question-replying system, multiple target reply statements may be determined. Specifically, the server may determine a preset quantity of target reply statements in multiple potential reply statements based on a descending order of sums. The preset quantity may be preset or changed. This is not limited in this embodiment.

It is noted that, if the N second prediction statements are determined in the first manner in step 104, in this step, before obtaining the sum of the first matching probability and the second matching probability of each of the M potential reply statements, the server needs to determine the second matching probability of each potential reply statement, that is, each potential reply statement is used as an input, and a probability that the to-be-processed statement is output is determined. If the N second prediction statements are determined in the second manner in step 104, because in step 104, the prediction statement is determined according to the first matching probability and the second matching probability, that is, the potential reply statement is determined according to the first matching probability and the second matching probability, in this step, the sum of first matching probability and the second matching probability of each potential reply statement may be directly obtained.

It is noted that, when the server is the executing body, after determining the target reply statement, the server sends the target reply statement to the terminal, and the terminal displays the target reply statement, for example, displays the target reply statement in the human computer interaction interface. When the terminal is the executing body, after determining the target reply statement, the terminal may directly display the target reply statement in the human computer interaction interface. The target reply statement may be output in a form of a voice, a text, or an image. This is not limited in this embodiment. When the output form is a voice, the target reply statement is converted into a voice for outputting. When the output form is an image, an image corresponding to the target reply statement is obtained from a correspondence between an image and a text indicated by the image, and the obtained image is output.

To further improve intelligence of a human computer interaction system, in this embodiment, the preset neural network may continue to learn according to a user feedback, that is, the parameter of the node in the preset neural network is adjusted. For example, the user feedback may be a target reply statement indicating a negative output such as "What are you talking about?", or "The reply sounds irrelevant", and the server may perform statistics on such a type of user feedback and an input and output statement pair indicated by the user feedback, and perform reversal training on the preset neural network according to an input and output statement pair that is obtained through statistics. For example, the input and output statement pair that is obtained through statistics is an input statement A and an output statement B, and when a target when the preset neural network is trained is the input statement A, a probability of the output statement B is 0. The neural network continues to learn according to the user feedback, thereby improving a learning capability during human computer interaction, and further improving intelligence of determining a reply statement in a human computer interaction process.

According to the method provided in this embodiment of the present disclosure, for multiple potential reply statements determined in matching processes, a final target reply statement may be determined with reference to a first matching probability that a potential reply statement is output when a to-be-processed statement is input and a second matching probability that the to-be-processed statement is output when the potential reply statement is input, so that the target reply statement and the to-be-processed statement better meet a linguistic context; and multiple prediction statements may be determined in each matching process, and multiple potential reply statements may be determined after the matching process ends, to provide diversified potential reply statements and improve intelligence of determining a target reply statement. Further, in each matching process, multiple prediction statements may be determined according to a first intermediate matching probability and a second intermediate matching probability of an intermediate statement, so that in each matching process, the linguistic context of the to-be-processed statement and the target reply statement is considered, thereby further improving intelligence of human computer interaction.

Figure 3:
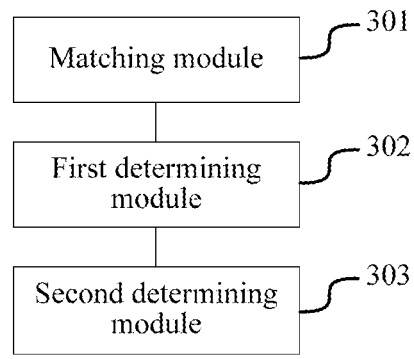
FIG. 3 is a block diagram of a reply statement determining apparatus according to an embodiment of the present disclosure.

FIG. 3 is a block diagram of a reply statement determining apparatus according to an embodiment of the present disclosure. Referring to FIG. 3, the apparatus includes a matching module 301, a first determining module 302, and a second determining module 303.

The matching module 301 is connected to the first determining module 302, and is configured to perform matching between an obtained to-be-processed statement and multiple words in a preset lexicon.

The first determining module 302 is connected to the second determining module 303, and is configured to: in each matching process, for N first prediction statements determined through previous matching, determine, according to first intermediate matching probabilities of multiple intermediate statements, N second prediction statements in the multiple intermediate statements, each intermediate statement being made up of any first prediction statement and any one of the multiple words, and the first intermediate matching probability of each intermediate statement being used to indicate a probability that the intermediate statement is output when the to-be-processed statement is input; and for each of the N second prediction statements, determine the second prediction statement as an potential reply statement if the second prediction statement includes a statement terminator, or use the second prediction statement as an input during next matching if the second prediction statement does not include a statement terminator, and continue matching, until second prediction statements output in the matching processes all include statement terminators.

The second determining module 303 is configured to determine, according to a first matching probability and a second matching probability of each of M potential reply statements obtained through matching, a target reply statement in the M potential reply statements, the second matching probability of the potential reply statement being used to indicate a probability that the to-be-processed statement is output when the potential reply statement is input. M is an integer greater than 1, and N is an integer less than or equal to M.

In an embodiment, the first determining module is configured to:

for each intermediate statement, use a first prediction statement corresponding to the intermediate statement, and the to-be-processed statement as an input, and determine a probability that the intermediate statement is output, as a first intermediate matching probability of the intermediate statement; and determine N second prediction statements in the multiple intermediate statements based on a descending order of the first intermediate matching probabilities; or for each intermediate statement, use a first prediction statement corresponding to the intermediate statement, and the to-be-processed statement as an input, and determine a probability that the intermediate statement is output, as a first intermediate matching probability of the intermediate statement; use the intermediate statement as an input, and determine a probability that the to-be-processed statement is output, as a second intermediate matching probability of the intermediate statement; obtain a sum of the first intermediate matching probability and the second intermediate matching probability of each intermediate statement; and determine the N second prediction statements in the multiple intermediate statements based on a descending order of the sums.

In an embodiment, the second determining module is configured to: obtain a sum of the first matching probability and the second matching probability of each of the N potential reply statements; and determine a potential reply statement having a highest sum as the target reply statement.

In an embodiment, the first determining module is further configured to: determine the M prediction words in the multiple words according to first matching probabilities of the multiple words, and use each prediction word as a prediction statement if current matching is first matching, where the first matching probability of each word is used to indicate a probability that the word is output when the to-be-processed statement is input.

In an embodiment, the first determining module is further configured to:

for each of the multiple words, use the to-be-processed statement as an input, and determine the probability that the word is output, as the first matching probability of the word; and determine the M prediction words in the multiple words based on a descending order of the first matching probabilities; or for each of the multiple words, use the to-be-processed statement as an input, and determine the probability that the word is output, as the first matching probability of the word; use the word as an input, and determine a probability that the to-be-processed statement is output, as a second matching probability of the word; obtain sums of the first matching probabilities and the second matching probabilities of the multiple words; and determine the M prediction words in the multiple words based on a descending order of the sums.

In an embodiment, the matching module is configured to perform matching between the obtained to-be-processed statement and the multiple words in the preset lexicon by using a preset neural network.

In an embodiment, the apparatus further includes:

a processing module, configured to: in a process of training the preset neural network, perform parallel processing on sample data by using multiple GPUs, where the preset neural network is configured for each of the multiple GPUs;

a third determining module, configured to determine an average gradient obtained by processing the sample data by the multiple GPUs; and an adjustment module, configured to adjust, according to the average gradient, a parameter of a node in the preset neural network configured for the multiple GPUs.

For multiple potential reply statements determined in matching processes, the apparatus provided in this embodiment of this disclosure may determine a final target reply statement with reference to a first matching probability that a potential reply statement is output when a to-be-processed statement is input and a second matching probability that the to-be-processed statement is output when the potential reply statement is input, so that the target reply statement and the to-be-processed statement better meet a linguistic context, to provide diversified potential reply statements and improve intelligence of determining a target reply statement.

It is noted that, when the reply statement determining apparatus provided in the foregoing embodiment determines a reply statement, division of the foregoing functional modules is merely used as an example for description, and during actual application, the foregoing functions may be accomplished by different functional modules as required, that is, the internal structure of the device is divided into different functional modules, so as to accomplish all or some of the functions described above. In addition, the reply statement determining apparatus provided in the foregoing embodiment belongs to the same concept as the embodiment of the reply statement determining method, and for a specific implementation process thereof, refer to the method embodiment, and details are not described herein again.

Figure 4:
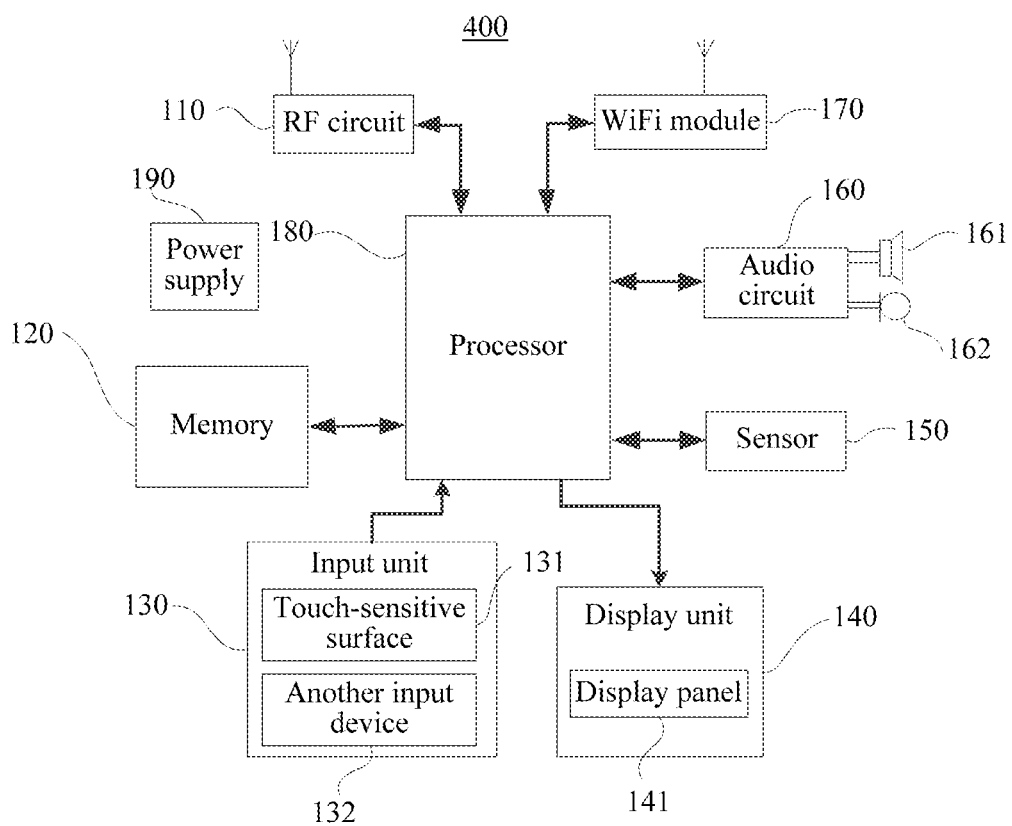
FIG. 4 is a schematic structural diagram of a terminal according to an embodiment of the present disclosure.

FIG. 4 is a schematic structural diagram of a terminal according to an embodiment of the present disclosure. The terminal may be configured to perform the reply statement determining method provided in the foregoing embodiments.

The terminal 400 may include components such as a radio frequency (RF) 110, a memory 120 including one or more computer readable storage mediums, an input unit 130, a display unit 140, a sensor 150, an audio circuit 160, a Wi-Fi module 170, a processor 180 including one or more processing cores, and a power supply 190. A person skilled in the art may understand that the structure of the terminal shown in FIG. 4 does not constitute a limitation to the terminal, and the terminal may include more components or fewer components than those shown in the figure, or some components may be combined, or a different component deployment may be used.

The RF circuit 110 may be configured to receive and send signals during information receiving and sending or during a call. Particularly, the RF circuit 110 receives downlink information from a base station, then delivers the downlink information to one or more processors 180 for processing, and sends related uplink data to the base station. Generally, the RF circuit 110 includes, but is not limited to, an antenna, at least one amplifier, a tuner, one or more oscillators, a subscriber identity module (SIM) card, a transceiver, a coupler, a low noise amplifier (LNA), and a duplexer. In addition, the RF circuit 110 may further communicate with a network and another device through wireless communication. The wireless communication may use any communication standard or protocol, including but not limited to a Global System for Mobile communications (GSM), a general packet radio service (GPRS), Code Division Multiple Access (CDMA), Wideband Code Division Multiple Access (WCDMA), Long Term Evolution (LTE), email, Short Messaging Service (SMS), and the like.

The memory 120 may be configured to store a software program and module. The processor 180 runs the software program and module stored in the memory 120, to implement various functional applications and data processing. The memory 120 may mainly include a program storage area and a data storage area. The program storage area may store an operating system, an application program used by at least one function (such as a sound playback function and an image display function), and the like. The data storage area may store data (such as audio data and an address book) created according to use of the terminal 400, and the like. In addition, the memory 120 may include a high-speed random access memory (RAM), and may further include a non-volatile memory, such as at least one magnetic disk storage device, a flash memory, or other volatile solid-state storage devices. Correspondingly, the memory 120 may further include a memory controller, to provide access of the processor 180 and the input unit 130 to the memory 120.

The input unit 130 may be configured to receive input digit or character information, and generate a keyboard, mouse, joystick, optical or track ball signal input related to the user setting and function control. Specifically, the input unit 130 may include a touch-sensitive surface 131 and another input device 132. The touch-sensitive surface 131, which is also referred to as a touchscreen or a touch panel, may collect a touch operation of a user on or near the touch-sensitive surface (such as an operation of a user on or near the touch-sensitive surface 131 by using any suitable object or accessory such as a finger or a stylus), and drive a corresponding connection apparatus according to a preset program. Optionally, the touch-sensitive surface 131 may include two parts: a touch detection apparatus and a touch controller. The touch detection apparatus detects a touch position of the user, detects a signal generated by the touch operation, and transfers the signal to the touch controller. The touch controller receives touch information from the touch detection apparatus, converts the touch information into touch point coordinates, and sends the touch point coordinates to the processor 180. Moreover, the touch controller can receive and execute a command sent by the processor 180. In addition, the touch-sensitive surface 131 may be implemented in multiple types, such as a resistive type, a capacitive type, an infrared type, and a surface acoustic wave type. In addition to the touch-sensitive surface 131, the input unit 130 may further include the another input device 132. Specifically, the another input device 132 may include, but is not limited to, one or more of a physical keyboard, a function key (for example, a volume control key or a power on/off key), a trackball, a mouse, or a joystick.

The display unit 140 may be configured to display information input by the user or information provided for the user, and various graphical user interfaces of the terminal 400. The graphical user interfaces may be composed of graphics, texts, icons, videos, and any combination thereof. The display unit 140 may include a display panel 141. Optionally, the display panel 141 may be configured by using a liquid crystal display (LCD), an organic light-emitting diode (OLED), or the like. Further, the touch-sensitive surface 131 may cover the display panel 141. After detecting a touch operation on or near the touch-sensitive surface 131, the touch-sensitive surface 141 transfers the touch operation to the processor 180, to determine the type of the touch event. Then, the processor 180 provides a corresponding visual output on the display panel 141 according to the type of the touch event. Although, in FIG. 4, the touch-sensitive surface 131 and the display panel 141 are used as two separate parts to implement input and output functions, in some embodiments, the touch-sensitive surface 131 and the display panel 141 may be integrated to implement the input and output functions.

The terminal 400 may further include at least one sensor 150 such as an optical sensor, a motion sensor, and other sensors. Specifically, the optical sensor may include an ambient light sensor and a proximity sensor. The ambient light sensor may adjust luminance of the display panel 141 according to brightness of the ambient light. The proximity sensor may switch off the display panel 141 and/or backlight when the terminal 400 is moved to the ear. As one type of motion sensor, a gravity acceleration sensor may detect magnitude of accelerations in various directions (generally on three axes), may detect magnitude and a direction of the gravity when static, and may be applied to an application that recognizes the attitude of the mobile phone (for example, switching between landscape orientation and portrait orientation, a related game, and magnetometer attitude calibration), a function related to vibration recognition (such as a pedometer and a knock), and the like. Other sensors such as a gyroscope, a barometer, a hygrometer, a thermometer, and an infrared sensor, which may be configured in the terminal 400, are not described in detail herein.

The audio circuit 160, a speaker 161, and a microphone 162 may provide audio interfaces between the user and the terminal 400. The audio circuit 160 may convert received audio data into an electrical signal and transmit the electrical signal to the speaker 161. The speaker 161 converts the electrical signal into a sound signal for output. On the other hand, the microphone 162 converts a collected sound signal into an electrical signal. The audio circuit 160 receives the electrical signal and converts the electrical signal into audio data, and outputs the audio data to the processor 180 for processing. Then, the processor 180 sends the audio data to, for example, another terminal by using the RF circuit 110, or outputs the audio data to the memory 120 for further processing. The audio circuit 160 may further include an earplug jack, to provide communication between a peripheral earphone and the terminal 400.

Wi-Fi is a short distance wireless transmission technology. The terminal 400 may help, by using the Wi-Fi module 170, the user to receive and send e-mails, browse a web page, access streaming media, and the like, which provides wireless broadband Internet access for the user. Although FIG. 4 shows the Wi-Fi circuit 170, it may be understood that the Wi-Fi circuit 170 is not a necessary component of the terminal 400. In some embodiments, the Wi-Fi circuit 170 may be omitted as long as the scope of the essence of the present disclosure is not changed.

The processor 180 is a control center of the terminal 400, which is connected to various parts of the entire mobile phone by using various interfaces and lines. By running or executing a software program and/or module stored in the memory 120 and invoking data stored in the memory 120, the processor 180 performs various functions of the terminal 400 and processes data, so as to perform overall monitoring on the mobile phone. Optionally, the processor 180 may include one or more processing cores. Preferably, the processor 180 may be integrated with an application processor and a modem processor. The application processor mainly processes an operating system, a user interface, an application program, and the like. The modem processor mainly processes wireless communication. It may be understood that the foregoing modem processor may not be integrated into the processor 180.

The terminal 400 further includes the power supply 190 (such as a battery) for supplying power to the components. Preferably, the power supply may be logically connected to the processor 180 by using a power management system, thereby implementing functions such as charging, discharging, and power consumption management by using the power management system. The power supply 190 may further include one or more of a direct current or alternating current power supply, a re-charging system, a power failure detection circuit, a power supply converter or inverter, a power supply state indicator, and any other components.

Although not shown in the figure, the terminal 400 may further include a camera, a Bluetooth module, and the like. Details are not described herein. Specifically, in this embodiment, the display unit of the terminal is a touchscreen display. The terminal further includes a memory and one or more programs. The one or more programs are stored in the memory and configured to be executed by one or more processors. The one or more programs include executable instructions; and the terminal 400 is configured to execute the instructions, to perform the method performed by the terminal in the foregoing embodiment of the reply statement determining method.

In an example embodiment, a computer readable storage medium including instructions, for example, a memory including instructions, is further provided. The instructions may be executed by a processor in a terminal, to complete the reply statement determining method in the foregoing embodiment. For example, the non-temporary computer readable storage medium may be a read-only memory (ROM), a RAM, a CD-ROM, a magnetic tape, a floppy disk, or an optical data storage device.

Figure 5:
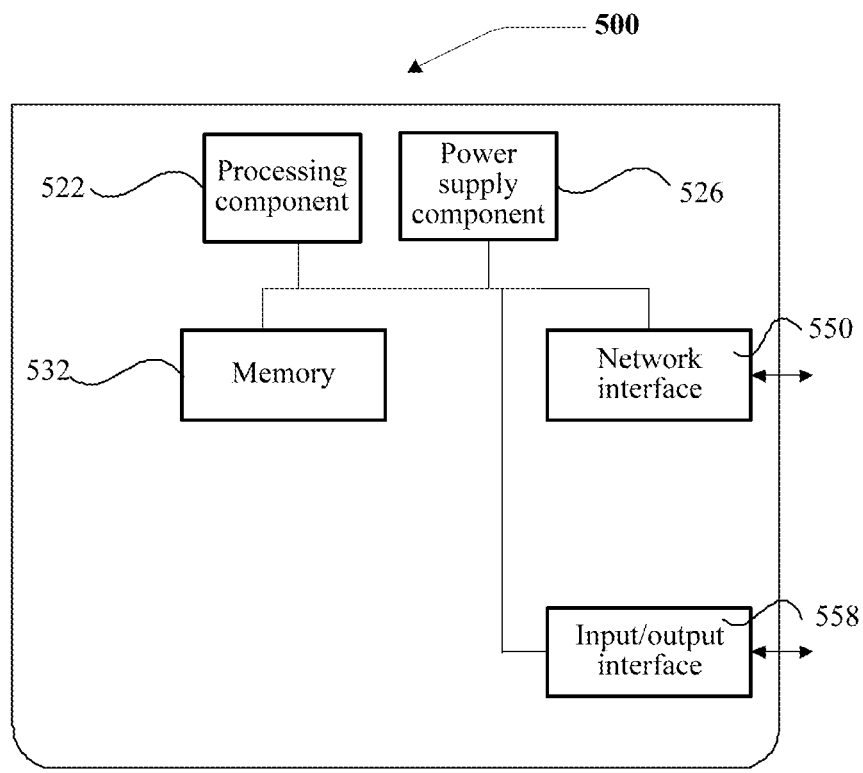
FIG. 5 is a block diagram of a reply statement determining apparatus according to an embodiment of the present disclosure.

FIG. 5 is a block diagram of a reply statement determining apparatus according to an embodiment of the present disclosure. For example, the apparatus 500 may be provided as a server. Referring to FIG. 5, the apparatus 500 includes a processor 522, and a memory resource indicated by a memory 532, used to store instructions, for example, an application program, that can be executed by the processor

522. The application program stored in the memory 532 may include one or more modules that each corresponds to one group of instructions. In addition, the processor 522 is configured to execute instructions stored in the memory 532, to perform the method performed by the server in the embodiment of the reply statement determining method:

performing matching between an obtained to-be-processed statement and multiple words in a preset lexicon;

in each matching process, for N first prediction statements determined through previous matching, determining, according to first intermediate matching probabilities of multiple intermediate statements, N second prediction statements in the multiple intermediate statements, each intermediate statement being made up of any first prediction statement and any one of the multiple words, and the first intermediate matching probability of each intermediate statement being used to indicate a probability that the intermediate statement is output when the to-be-processed statement is input; and for each of the N second prediction statements, determining the second prediction statement as a potential reply statement if the second prediction statement includes a statement terminator, or using the second prediction statement as an input during next matching if the second prediction statement does not include a statement terminator, and continuing matching, until second prediction statements output in the matching processes all include statement terminators; and determining, according to a first matching probability and a second matching probability of each of M potential reply statements obtained through matching, a target reply statement in the M potential reply statements, the second matching probability of the potential reply statement being used to indicate a probability that the to-be-processed statement is output when the potential reply statement is input, M being an integer greater than 1, and N being an integer less than or equal to M.

In an embodiment, the processor is further configured to perform the following step:

for each intermediate statement, using a first prediction statement corresponding to the intermediate statement, and the to-be-processed statement as an input, and determining a probability that the intermediate statement is output, as a first intermediate matching probability of the intermediate statement; and determining N second prediction statements in the multiple intermediate statements based on a descending order of the first intermediate matching probabilities.

In an embodiment, the processor is further configured to perform the following step:

for each intermediate statement, using a first prediction statement corresponding to the intermediate statement, and the to-be-processed statement as an input, and determining a probability that the intermediate statement is output, as a first intermediate matching probability of the intermediate statement; using the intermediate statement as an input, and determining a probability that the to-be-processed statement is output, as a second intermediate matching probability of the intermediate statement; obtaining a sum of the first intermediate matching probability and the second intermediate matching probability of each intermediate statement; and determining the N second prediction statements in the multiple intermediate statements based on a descending order of the sums.

In an embodiment, the processor is further configured to perform the following steps:

obtaining a sum of the first matching probability and the second matching probability of each of the N potential reply statements; and determining a potential reply statement having a highest sum as the target reply statement.

In an embodiment, the processor is further configured to perform the following step:

determining the M prediction words in the multiple words according to first matching probabilities of the multiple words, and using each prediction word as a prediction statement if current matching is first matching, where the first matching probability of each word is used to indicate a probability that the word is output when the to-be-processed statement is input.

In an embodiment, the processor is further configured to perform the following step:

for each of the multiple words, using the to-be-processed statement as an input, and determining the probability that the word is output, as the first matching probability of the word; and determining the M prediction words in the multiple words based on a descending order of the first matching probabilities.

In an embodiment, the processor is further configured to perform the following step:

for each of the multiple words, using the to-be-processed statement as an input, and determining the probability that the word is output, as the first matching probability of the word; using the word as an input, and determining a probability that the to-be-processed statement is output, as a second matching probability of the word; obtaining sums of the first matching probabilities and the second matching probabilities of the multiple words; and determining the M prediction words in the multiple words based on a descending order of the sum.

In an embodiment, the processor is further configured to perform the following step:

performing matching between the obtained to-be-processed statement and the multiple words in the preset lexicon by using a preset neural network.

In an embodiment, the processor is further configured to perform the following steps:

in a process of training the preset neural network, performing parallel processing on sample data by using multiple GPUs, where the preset neural network is configured for each of the multiple GPUs;

determining an average gradient obtained by processing the sample data by the multiple GPUs; and adjusting, according to the average gradient, a parameter of a node in the preset neural network configured for the multiple GPUs.

The apparatus 500 may further include a power supply component 526 configured to perform power management on the apparatus 500, a wired or wireless network interface 550, configured to connect the apparatus 500 to a network, and an input/output (I/O) interface 558. The apparatus 500 may operate an operating system stored in the memory 532, for example, the Windows Server™, the Mac OS X™, the Unix™, the Linux™, or the FreeBSD™.

In an example embodiment, a computer readable storage medium is further provided. A computer program is stored in the computer readable storage medium, for example, a memory including a computer program, and when being executed by the processor, the computer program implements steps in the foregoing embodiment of the reply statement determining method. For example, the computer readable storage medium may be a ROM, a RAM, a CD-ROM, a magnetic tape, a floppy disk, or an optical data storage device.

A person of ordinary skill in the art may understand that all or some of the steps of the embodiments may be implemented by hardware or a program instructing related hardware. The program may be stored in a computer readable storage medium. The storage medium may include: a ROM, a magnetic disk, or an optical disc.

Figure 6:
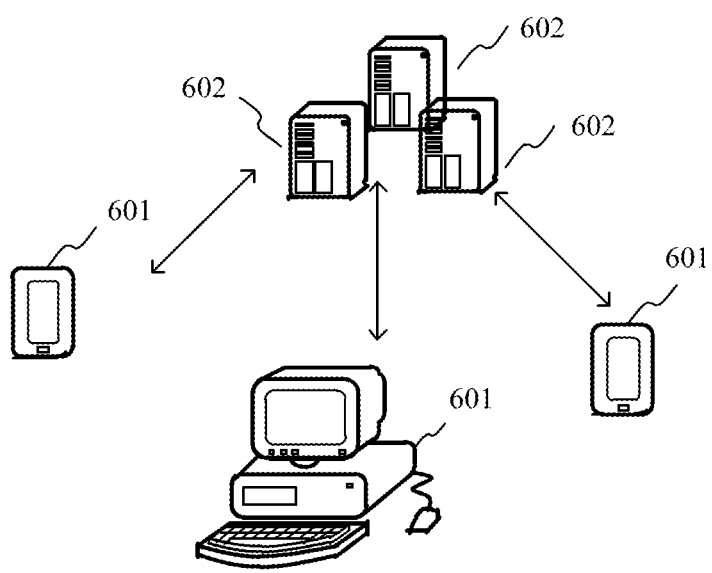
FIG. 6 is a diagram of an implementation environment according to an embodiment of the present disclosure.

FIG. 6 is a diagram of an implementation environment according to an embodiment of the present disclosure. The implementation environment includes multiple terminals 601, and a server 602 configured to provide a service to the multiple terminals. The multiple terminals 601 is connected to the server 602 by using a wireless or wired network. The multiple terminals 601 may be electronic devices that can access the server 602. The electronic device may be a computer, a smartphone, a tablet computer, or another electronic device. The server 602 may be one or more website servers. The server 602 may serve as a device that processes a statement. The server 602 may perform matching between a statement sent by a user that accesses the server and a preset lexicon, to determine a target reply statement, and finally return the target reply statement to the user, to implement human computer interaction. The server may be a man-computer chat server, or may be an intelligent question-replying server, or the like.

Figure 7:
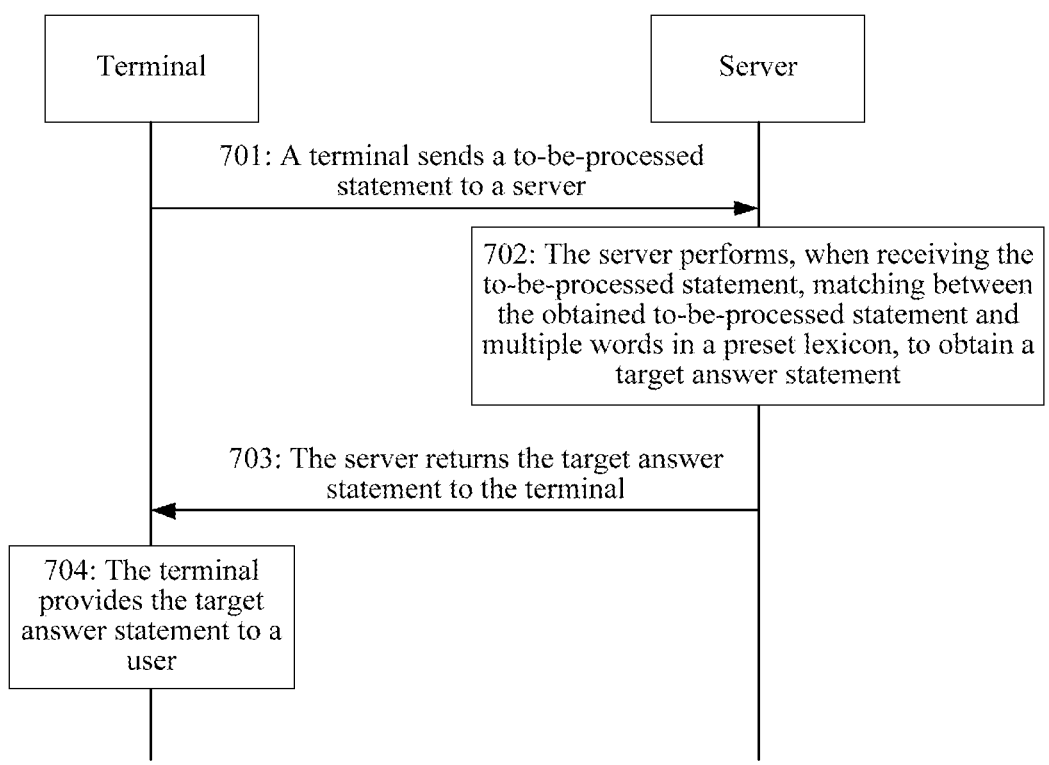
FIG. 7 is a flowchart of a specific implementation method of a reply statement determining method according to an embodiment of the present disclosure.

FIG. 7 is a flowchart of a specific implementation method of a reply statement determining method according to an embodiment of the present disclosure. Referring to FIG. 7, the method is described by using an example in which a user implements human computer interaction with a server by using a terminal, and specifically includes the following steps:

701: The terminal sends a to-be-processed statement to the server.

The user may implement human computer interaction with the server by using the terminal. For example, the user may enter a to-be-processed statement in a form of a text in the terminal, or the user may enter a to-be-processed statement in a form of a voice in the terminal by using a voice. After receiving the to-be-processed statement, the terminal may perform no excessive processing, and directly send the to-be-processed statement to the server, or when the to-be-processed statement is in a form other than a form of a text, convert the to-be-processed statement from another form to a form of a text, to ensure that the sent to-be-processed statement is in a form of a text.

702: The server performs, when receiving the to-be-processed statement, matching between the obtained to-be-processed statement and multiple words in a preset lexicon, to obtain a target reply statement.

Matching in step 702 is similar to the matching process in step 103 to step 107, and details are not described herein again. It is noted that, a human computer interaction form may be preset. For example, human computer interaction may be performed by using a voice, so that the target reply statement may be converted on a server side, to generate a voice signal and send the voice signal to the terminal; or the server may not perform voice conversion, but send the target reply statement in a form of a text to the terminal, and the terminal generates a voice signal based on the target reply statement and plays back the voice signal. This is not specifically limited in this embodiment of the present disclosure.

703: The server returns the target reply statement to the terminal.

704: The terminal provides the target reply statement to the user.

A specific providing manner is not limited in this embodiment of the present disclosure. The providing manner may be a screen display manner or a voice playback manner, which needs to be performed based on a specified human computer interaction manner.

The foregoing descriptions are merely exemplary embodiments of the present disclosure, but are not intended to limit the present disclosure. Any modification, equivalent replacement, or improvement made without departing from the spirit and principle of the present disclosure shall fall within the protection scope of the present disclosure.

What is claimed is:

1. A method for determining a reply statement, comprising:

determining, by processing circuitry of an apparatus and based on a preset lexicon, a plurality of potential reply statements in response to a statement, and a plurality of first matching probabilities respectively corresponding to the plurality of potential reply statements, a first matching probability in the plurality of first matching probabilities indicating a probability of the corresponding potential reply statement being output in response to the statement according to the preset lexicon;

determining, by the processing circuitry and for each of words in the statement, a first probability of the respective word being output in response to one of the plurality of potential reply statements according to the preset lexicon;

obtaining, by the processing circuitry, a plurality of second matching probabilities respectively corresponding to the plurality of potential reply statements, a second matching probability in the second matching probabilities indicating a sum of first probabilities of the words in the statement being output in response to the corresponding potential reply statement according to the preset lexicon; and selecting, by the processing circuitry, one of the potential reply statements as a target reply statement according to a combination of the first matching probabilities and the second matching probabilities, wherein each of the plurality of potential reply statements is determined based on a sum of a respective first intermediate matching probability and a respective second intermediate matching probability, the respective first intermediate matching probability indicates a probability of one of a plurality of potential intermediate statements being output in response to the statement, the respective second intermediate matching probability indicates a sum of second probabilities of the words in the statement being output in response to the one of the plurality of potential intermediate statements, and each potential intermediate statement does not include a statement terminator.

2. The method of claim 1, further comprising:

matching, by the processing circuitry, the statement to words in the preset lexicon to determine a plurality of first matching words;

initializing, by the processing circuitry, intermediate statements, based on the plurality of first matching words;

repetitively matching, by the processing circuitry, an intermediate statement to the words in the preset lexicon to determine additional intermediate words for continuously adding into the intermediate statement to grow the intermediate statement until the statement terminator is added; and finalizing, by the processing circuitry, the intermediate statement to a potential reply statement when the statement terminator is added in the intermediate statement.

3. The method of claim 2, wherein the repetitively matching the intermediate statement to the words in the preset lexicon includes:

matching, by the processing circuitry, the intermediate statement to the words in the preset lexicon to determine second matching words with first intermediate matching probabilities; and selecting, by the processing circuitry, a subset of the second matching words to add into the intermediate statement to respectively form the potential intermediate statements for a next matching, according to a sorted sequence of the first intermediate matching probabilities, wherein each of the first intermediate matching probabilities indicates a probability of a corresponding potential intermediate statement in the plurality of potential intermediate statements being output in response to the statement.

4. The method of claim 3, further comprising:

determining, by the processing circuitry and for each of the words in the statement, a second probability of the respective word being output in response to one of the potential intermediate statements according to the preset lexicon;

matching, by the processing circuitry, the potential intermediate statements having the respective first intermediate matching probabilities to the words in the preset lexicon to determine respective second intermediate matching probabilities for matching existing words in the intermediate statement, each of the second intermediate matching probabilities indicating a sum of the second probabilities of the words in the statement being output in response to the corresponding potential intermediate statement according to the preset lexicon;

associating, by the processing circuitry, respective sums of the first intermediate matching probabilities and the second intermediate matching probabilities to the potential intermediate statements; and selecting, by the processing circuitry, a subset of the potential intermediate statements for the next matching, according to a sorted sequence of the sums.

5. The method of claim 4, wherein the matching the statement to the words in the preset lexicon includes:

matching, by the processing circuitry, the statement to the words in the preset lexicon to determine potential matching words with first matching word probabilities;

sorting, by the processing circuitry, the first matching word probabilities in a sequence from high to low; and selecting, by the processing circuitry, the plurality of first matching words from the potential matching words according to the sorted sequence, wherein each of the first matching word probabilities indicates a probability of a corresponding potential matching word being output in response to the statement.

6. The method of claim 5, further comprising:

determining, by the processing circuitry and for each of the words in the statement, a third probability of the respective word being output in response to one of the potential matching words according to the preset lexicon;

matching, by the processing circuitry, the potential matching words to the words in the preset lexicon to determine second matching word probabilities for matching the words in the statement, each of the second matching word probabilities indicating a sum of third probabilities of the words in the statement being output in response to the corresponding potential matching word according to the preset lexicon;

associating, by the processing circuitry, respective sums of the first matching word probabilities and the second matching word probabilities to the potential matching words; and selecting, by the processing circuitry, a subset of the potential matching words as the plurality of first matching words according to the sorted sequence.

7. The method of claim 6, wherein a preset neural network is used to determine the first matching probabilities, the second matching probabilities, the first intermediate matching probabilities, the second intermediate matching probabilities, the first matching word probabilities, the second matching word probabilities, the first probabilities of the words in the statement, the second probabilities of the words in the statement, and the third probabilities of the words in the statement.

8. The method of claim 7, further comprising:

calculating, by multiple graphics processing units (GPUs), gradients based on sample inputs to the preset neural network and outputs of the preset neural network in response to the sample inputs;

determining, by the processing circuitry, an average of the gradients; and adjusting, by the processing circuitry, parameters of nodes in the preset neural network according to the average of the gradients.

9. An apparatus for determining a reply statement, comprising:

memory circuitry configured to store a preset lexicon; and processing circuitry configured to:

determine, based on the preset lexicon in the memory circuitry, a plurality of potential reply statements in response to a statement, and a plurality of first matching probabilities respectively corresponding to the plurality of potential reply statements, a first matching probability in the plurality of first matching probabilities indicating a probability of the corresponding potential reply statement being output in response to the statement according to the preset lexicon;

determine, for each of words in the statement, a first probability of the respective word being output in response to one of the plurality of potential reply statements according to the preset lexicon;

obtain a plurality of second matching probabilities respectively corresponding to the plurality of potential reply statements, a second matching probability in the second matching probabilities indicating a sum of first probabilities of the words in the statement being output in response to the corresponding potential reply statement according to the preset lexicon; and select one of the potential reply statements as a target reply statement according to a combination of the first matching probabilities and the second matching probabilities, wherein each of the plurality of potential reply statements is determined based on a sum of a respective first intermediate matching probability and a respective second intermediate matching probability, the respective first intermediate matching probability indicates a probability of one of a plurality of potential intermediate statements being output in response to the statement, the respective second intermediate matching probability indicates a sum of second probabilities of the words in the statement being output in response to the one of the plurality of potential intermediate statements, and each potential intermediate statement does not include a statement terminator.

10. The apparatus of claim 9, wherein the processing circuitry is further configured to:
match the statement to words in the preset lexicon to determine a plurality of first matching words;
initialize intermediate statements based on the plurality of first matching words;
repetitively match an intermediate statement to the words in the preset lexicon to determine additional intermediate words for continuously adding into the intermediate statement to grow the intermediate statement until the statement terminator is added; and
finalize the intermediate statement to a potential reply statement when the statement terminator is added in the intermediate statement.

11. The apparatus of claim 10, wherein the processing circuitry is further configured to:
match the intermediate statement to the words in the preset lexicon to determine second matching words with first intermediate matching probabilities; and
select a subset of the second matching words to add into the intermediate statement to respectively form the potential intermediate statements for a next matching, according to a sorted sequence of the first intermediate matching probabilities,
wherein each of the first intermediate matching probabilities indicates a probability of a corresponding potential intermediate statement in the plurality of potential intermediate statements being output in response to the statement.

12. The apparatus of claim 11, wherein the processing circuitry is further configured to:
determine, for each of the words in the statement, a second probability of the respective word being output in response to one of the potential intermediate statements according to the preset lexicon;
match the potential intermediate statements having the respective first intermediate matching probabilities to the words in the preset lexicon to determine respective second intermediate matching probabilities for matching existing words in the intermediate statement, each of the second intermediate matching probabilities indicating a sum of the second probabilities of the words in the statement being output in response to the corresponding potential intermediate statement according to the preset lexicon;
associate respective sums of the first intermediate matching probabilities and the second intermediate matching probabilities to the potential intermediate statements; and
select a subset of the potential intermediate statements for the next matching, according to a sorted sequence of the sums.

13. The apparatus of claim 12, wherein the processing circuitry is further configured to:
match the statement to the words in the preset lexicon to determine potential matching words with first matching word probabilities;
sort the first matching word probabilities in a sequence from high to low; and
select the plurality of first matching words from the potential matching words according to the sorted sequence,
wherein each of the first matching word probabilities indicates a probability of a corresponding potential matching word being output in response to the statement.

14. The apparatus of claim 13, wherein the processing circuitry is further configured to:
determining, for each of the words in the statement, a third probability of the respective word being output in response to one of the potential matching words according to the preset lexicon;
match the potential matching words to the words in the preset lexicon to determine second matching word probabilities for matching the words in the statement, each of the second matching word probabilities indicating a sum of third probabilities of the words in the statement being output in response to the corresponding potential matching word according to the preset lexicon;
associate respective sums of the first matching word probabilities and the second matching word probabilities to the potential matching words; and
select a subset of the potential matching words as the plurality of first matching words according to the sorted sequence.

15. The apparatus of claim 14, wherein a preset neural network is used to determine the first matching probabilities, the second matching probabilities, the first intermediate matching probabilities, the second intermediate matching probabilities, the first matching word probabilities, the second matching word probabilities, the first probabilities of the words in the statement, the second probabilities of the words in the statement, and the third probabilities of the words in the statement.

16. The apparatus of claim 15, further comprising:
multiple graphics processing units (GPUs) configured to calculate gradients based on sample inputs to the preset neural network and outputs of the preset neural network in response to the sample inputs; and
processing circuitry configured to:
determine an average of the gradients calculated by the GPUs; and
adjust parameters of nodes in the preset neural network according to the average of the gradients.

17. A non-transitory computer-readable medium storing computer-readable instructions therein which when executed by a computer cause the computer to perform:
determining, based on a preset lexicon, a plurality of potential reply statements in response to a statement, and a plurality of first matching probabilities respectively corresponding to the plurality of potential reply statements, a first matching probability in the plurality of first matching probabilities indicating a probability of the corresponding potential reply statement being output in response to the statement according to the preset lexicon;
determining, for each of words in the statement, a first probability of the respective word being output in response to one of the plurality of potential reply statements according to the preset lexicon;
obtaining a plurality of second matching probabilities respectively corresponding to the plurality of potential reply statements, a second matching probability in the second matching probabilities indicating a sum of first probabilities of the words in the statement being output in response to the corresponding potential reply statement according to the preset lexicon; and selecting one of the potential reply statements as a target reply statement according to a combination of the first matching probabilities and the second matching probabilities, wherein each of the plurality of potential reply statements is determined based on a sum of a respective first intermediate matching probability and a respective second intermediate matching probability, the respective first intermediate matching probability indicates a probability of one of a plurality of potential intermediate statements being output in response to the statement, the respective second intermediate matching probability indicates a sum of second probabilities of the words in the statement being output in response to the one of the plurality of potential intermediate statements, and each potential intermediate statement does not include a statement terminator.

18. The non-transitory computer-readable medium of claim 17, storing computer-readable instructions which when executed by the computer cause the computer to further perform:

matching the statement to words in the preset lexicon to determine a plurality of first matching words;

initializing intermediate statements, based on the plurality of first matching words;

repetitively matching an intermediate statement to the words in the preset lexicon to determine additional intermediate words for continuously adding into the intermediate statement to grow the intermediate statement until the statement terminator is added; and finalizing the intermediate statement to a potential reply statement when the statement terminator is added in the intermediate statement.

19. The non-transitory computer-readable medium of claim 18, storing computer-readable instructions which when executed by the computer cause the computer to further perform:

matching the intermediate statement to the words in the preset lexicon to determine second matching words with first intermediate matching probabilities; and selecting a subset of the second matching words to add into the intermediate statement to respectively form the potential intermediate statements for a next matching, according to a sorted sequence of the first intermediate matching probabilities, wherein each of the first intermediate matching probabilities indicates a probability of a corresponding potential intermediate statement in the plurality of potential intermediate statements being output in response to the statement.

20. The non-transitory computer-readable medium of claim 19, storing computer-readable instructions which when executed by the computer cause the computer to further perform:

determining, for the words in the statement, a second probability of the respective word being output in response to one of the potential intermediate statements according to the preset lexicon;

matching the potential intermediate statements having the respective first intermediate matching probabilities to the words in the preset lexicon to determine respective second intermediate matching probabilities for matching existing words in the intermediate statement, each of the second intermediate matching probabilities indicating a sum of the second probabilities of the words in the statement being output in response to the corresponding potential intermediate statement according to the preset lexicon;

associating respective sums of the first intermediate matching probabilities and the second intermediate matching probabilities to the potential intermediate statements; and selecting a subset of the potential intermediate statements for the next matching, according to a sorted sequence of the sums.

* * * * *